United States Patent [19]
Puryear

[11] Patent Number: 5,669,566
[45] Date of Patent: Sep. 23, 1997

[54] LINE GUIDE FOR FISHING REELS AND METHOD OF PREVENTING LINE TWIST

[76] Inventor: John W. Puryear, 130 Janelle Dr., Bay St. Louis, Miss. 39520

[21] Appl. No.: 519,762

[22] Filed: Aug. 28, 1995

Related U.S. Application Data

[63] Continuation-in-part of Ser. No. 40,104, Mar. 30, 1993, Pat. No. 5,467,932.

[51] Int. Cl.$^6$ .......................... A01K 89/01; A01K 87/04; B65H 57/00; B65H 57/06
[52] U.S. Cl. ............... 242/234; 242/236; 242/157 R; 242/615.3; 43/24
[58] Field of Search .............................. 242/228, 234, 242/235, 236, 238, 239, 240, 231, 232, 321, 157, 615.3; 43/24

[56] References Cited

U.S. PATENT DOCUMENTS

| | | | |
|---|---|---|---|
| 2,147,063 | 2/1939 | Sanford, Jr. | 242/157 R X |
| 2,197,245 | 4/1940 | Sanford, Jr. | 242/157 R X |
| 2,306,112 | 12/1942 | Touchstone | 43/24 |
| 2,767,935 | 10/1956 | Fowler | 242/235 |
| 3,327,962 | 6/1967 | Sarah | 242/236 |
| 3,534,919 | 10/1970 | Rowe | 242/236 X |
| 4,610,402 | 9/1986 | Corett et al. | 242/157 R X |
| 4,637,569 | 1/1987 | Switsher | 242/239 |
| 5,467,932 | 11/1995 | Puryear | 242/236 |

FOREIGN PATENT DOCUMENTS

| | | | |
|---|---|---|---|
| 324855 | 9/1919 | Germany | 242/157 R |

*Primary Examiner*—Michael Mansen
*Attorney, Agent, or Firm*—Joseph T. Regard, Ltd. PLC

[57] ABSTRACT

A line guide with a freely rotating inner race supported on ball bearings for use with spincast and spinning fishing reels. The line guide is attached forward of line spool either on the reel or the fishing rod to reduce friction and line twist.

7 Claims, 2 Drawing Sheets

LINE GUIDE FOR FISHING REELS AND METHOD OF PREVENTING LINE TWIST

CROSS-REFERENCE

This application is a continuation-in-part of application Ser. No. 08/040,104, filed Mar. 30, 1993, now U.S. Pat. No. 5,467,932.

BACKGROUND OF THE INVENTION

This invention relates to the field of Spin Cast and Spinning reels for fishing rods. Spin Cast reels are best identified by their having a fishing line wound on a totally covered, normally non rotatable spool which is mounted with an axis parallel to the fishing rod to which the reel is attached. The fishing line is wound onto the spool by a winding spinner head, sometimes called a winding drum, within the cover. By contrast, Spinning reels have open face, normally non rotatable spools with their oxis parallel to the rod, but have a rotating bail which winds the fishing line onto the reel spool during take-up. Casting reels have rotating line spools transverse to the rod. These types of reels are commonly known in the fishing reel industry.

All fishing reels, whether spinning or spin cast, that pay line off ot retrieve line through a line guide, over an edge or a flange that is perpendicular to the axis of the stationary spool impart a certain amount of twist to the line as it pays out or is retrieved. Due to idiosyncracies in the line itself and to certain mechanical parameters such as spool diameter, line tension as wound onto the spool and the mechanism that winds the line onto the spool this twist is not necessarily one twist per spool revolution as may be imagined. This statement is true of "round" monofilament fishing line only. Braided line has a completely different set of characteristics and is not suitable or commonly used for spin cast or spinning type reels. The same is true for the new "oval" monofilament fishing line which is manufactured and sold for revolving spool bait cast reels only.

Most line twist is accentuated by the method of retrieval more so than by paying out freely during a cast. Key factors in accentuation or reducing line twist during retrieval of line are size, shape and friction characteristics of line guiding components mounted in or to the front covers of spin cast reels and the rod guide closest to the reel in spinning reels. The actual winding mechanism, spinner head or bail, is the other key mechanical factor associated with line twist during retrieval.

In order to better understand why line tends to twost as it is cast and retrieved through a line guide, consider the line guide mounted into the front cover of a conventional spin cast reel to be replaced with an internal toothed spur gear having 50 teeth. Then consider the line to have 5 tooth grooves about its outer circumference and extending along its length that mate with the teeth of the line guide. The line may be moved back and forth longitudinally through the line guide with the teeth fully engaged and no twisting or rotating of the line will occur. But to show similarity to an actual fishing reel situation, consider that to cast a lure the line must unwind from a storage spool that has its axis parallel to the axis of the line guide. This unwinding action causes the line to rotate about the inside circumference of the line guide once per each revolution off the spool. Assuming that the line teeth remain in contact with the line guide teeth, the line will be forced to rotate about its own axis and line twist will be induced at a rate equal to the ratio of the number of line teeth to the number of line guide teeth. For example:

$$\frac{50 \text{ internal line guide teeth}}{5 \text{ external line teeth}} = \frac{10 \text{ line twists}}{\text{revolution}}$$

Assume 200 revolutions to attain a normal length cast. The resulting line twist would be:

$$\frac{200 \text{ revolution} \times 10 \text{ line twists}}{\text{cast revolution}} = \frac{2,000 \text{ line twists}}{\text{cast}}$$

Larger diameter line guides with more gear teeth would increase this resultant number of line twists as smaller diameter line guides with fewer number of gear teeth would decrease it.

Assuming no change in the number of line twists due to lure rotation during casting, retrieving the lure and winding the line back onto the spool would cancel the twist induced into the line by the casting process. In actual use friction replaces the afore mentioned gear teeth. During casting, centrifugal force is not sufficient to hold the line firmly enough against the line guide as it exits the reel to cause line twist or rotation as described with gear teeth and constant tooth mesh but some twisting does occur. Retrieval of the line creates a situation more closely akin to that of the gear teeth example. Line is retrieved at much more tension than it is cast, therefore less rotational slippage occurs between the line outer surface and the line guide inner surface thus inducing twists in the line as it is wound onto the spool. The nature of monofilament line causes it to try to absorb some of this twist, which is does, but its surface then becomes rough and irregular, similar to that of twisted ornamental iron railings, rather than round and smooth as in its original condition. This condition may be found on most spinning and spin cast reels after use. The roughened surface may be seen as well as felt with the hand. This change in the normal configuration of monofiliment line tends to weaken it to less than its rated strength, thus causing loss of fish and lures. It also adversely affects the smooth casting characteristics of the line and causes the line to reflect light at a greater rate making it more visible to the fish thus causing less fish to be caught and more frequent changing of the line.

The afore described reasons causing line twist in fishing reels are not necessarily commonly known or understood in the fishing reel industry but experiencing line twist and its associated problems is. Many things have been tried in an effort to reduce line twist but mosst have been marginally effective. Larger and smaller line guides have been tried. Friction reducing materials such as ceramic and hard chrome do help somewhat but are not as effective as this new freely rotating line guide.

SUMMARY OF THE INVENTION

This invention discloses a line guide for spin cast and spinning reels which reduces friction and line twist during casting and retrieval. The invention is a friction and line twist reducing line guide for reels having a line spool which has its axis aligned along the axis of a fishing rod. A spin cast reel with a rotating winding drum or spinner head covering the front of the spool, having retractable fingers, serves to wind up the line on the spool during retrieval. A spinning reel with a rotating bail to the side of the spool serves to wind line on the spool during retrieval. On both types of reels the line passes from the apool through a freely rotatable line guide which is mounted forward of the spool. The line guide is lined with a feely spinning surface possibly supported on ball bearings. The freely rotatable line guide significantly reduces line twist as the line is retrieved minimizing tangle. In spin cast reels this line guide is normally mounted into a front housing. In spinning reels this line guide would be included in the rod guide mounted closest to the reel.

In spin cast reels, during the hooking of fish and retieval of the line, the spinner head is rotated by a geared hand crank to retrieve the line and wind it on the spool. The line rides on extendable spinner head pins, which carry the line around the spool. Drag may be provided by the spinner head, or by permitting the spool to rotate against drag brakes. in spinning reels during hooking of fish and retrieval of the line, the bail is rotated by a geared hand crank to retrieve the line and wind it on the spool.

It is thus an object of this invention to disclose a line guide for reels that will reduce line twist and friction during line retrieval by allowing the line contacting inner surface of the line guide to rotate freely and to be rotated about it's axis by the normal rotating and twisting motion that is imparted to the line by the rewinding mechanism during retrieval and rewinding of the line onto the spool. As the line is drawn through the line guide and wrapped onto the spool by the rotating line winding mechanism it is force to travel around the inside circumference of the guide, thus causing the line to rotate rapidly about its own axis as well as the axis of the spinner head. This action causes considerable twisting of the line as it is wound onto the spool. In actual use, friction replaces the gear teeth which allows some rotational slippage between the line and the inside surface of the line guide, thus reduced twisting, ut the resultant action is not reduced significantly. Using this same planetary gear illustration, this new invention would support the outer ring gear with sime form of bearings and allow it to rotate wiht the line thus eliminating a major portion of line twist.

It is a further object of this invention to provide an after market accessory or modification to existing reels and rods on the market which could be utilized by consumers who may purchase or have purchased products without these features and later desire them.

DETAILED DESCRIPTION FO THE INVENTION

Figure 1:
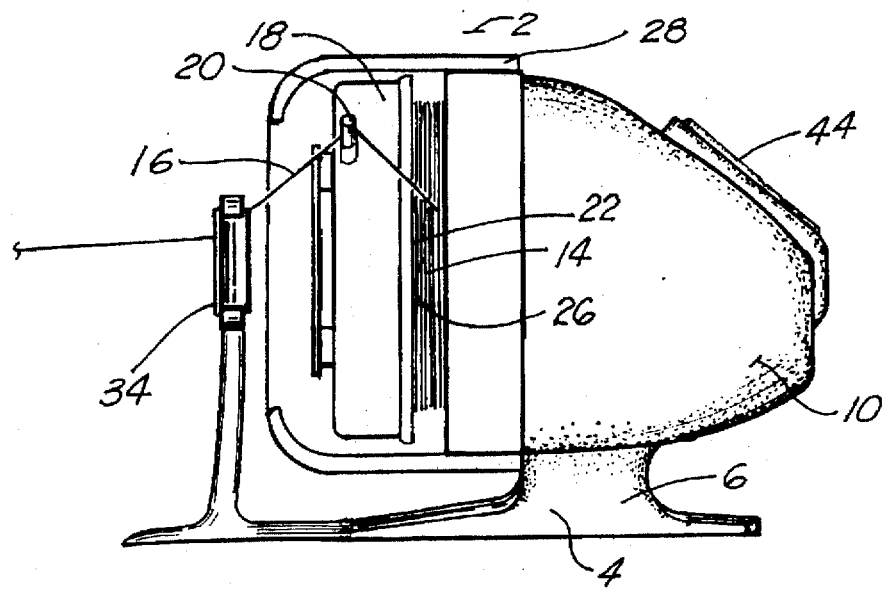
FIG. 1 is cut away side view of one embodiment of the invention showing a spin cast reel with the line quide mounted to the base of the reel.
Figure 2:
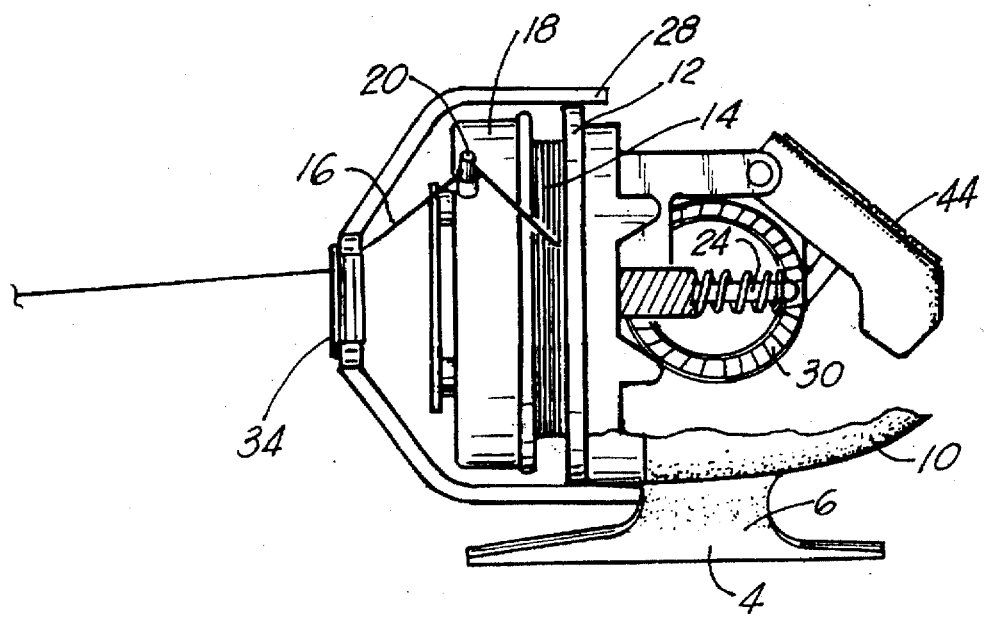
FIG. 2 is a cut away side view of a second embodiment of the invention showning a spin cast reel with the line guide mounted into the front housing of the reel.
Figure 3:
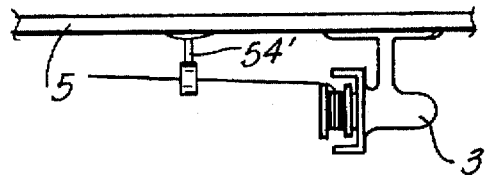
FIG. 3 is a side view of one embodiment of the invention showing a spinning reel with the line guide mounted to the rod in front of the reel.
Figure 4:
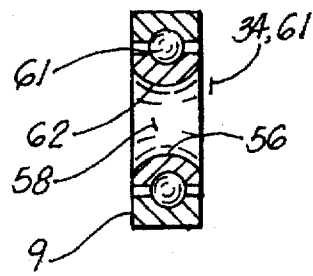
FIG. 4 is a cut away view of the invention showing the line guide as a ball bearing insert.
Figure 6:
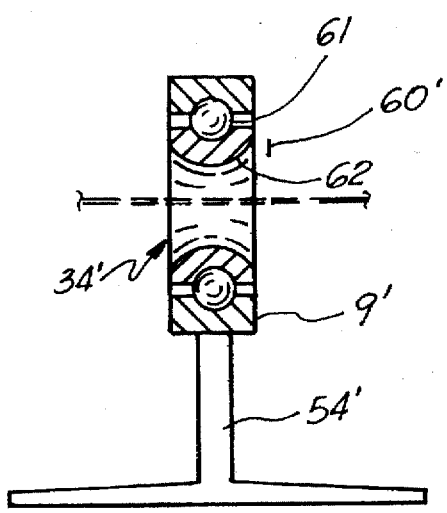
FIG. 6 is a cut away view of the invention showing the freely rotating inner race, supported on ball bearings, where the outer race constitutes a portion of fishing rod line guide.

The exemplary embodiment of the invention is shown in FIGS. 1, 2, and 3. The invention is a friction and line twist reducing line guide 34 for spin cast reels 2, spinning reels 3, and fishing rods 5, having a freely rotatable line contacting inner race 62, friction reducing balls 61, and an outer race 9, 9' and 54.

In a spin cast reel 2 having a base 4 for mounting to a rod and a support 6 arising from the base 4, supporting a back housing 10. This back housing 10 is an enclosed metal or plastic shell which is affixed to a front plate 12. Axially mounted in front of the front plate 12 is a line spool 14. A fishing line 16 is wound on the spool 14.

A spinner head 18, in the form of a reversed open metal cup with extensible pins 20 extending through the periphery, is mounted over the front end 22 of the line spool 14, and is removably affixed to an axle 24 passing through the center 26 of teh spool 14. This axlw 24 is mounted in the front plate 12, through a suitable bearing (not shown) for rotation. The axle 24 is spring loaded, for lateral motion along the axis of the reel, and is driven in rotation by a pinion gear, which is driven in turn by a drive gear 30, which the user turns by means of a reel handle 32 (not shown). The construction of the gearing, axle 24 and spinner head 18 is well known in the art of spin cast reel design, and is not further described or shown here.

Alternate forms of reels (not shown) are equally suitable for the invention. It can be readily seen that a spinning reel or a spincast reel, having a rotating spool, can be substituted for the spincast reel as described above.

Mounted forward of the front end 22 of the spool 14 is a line guide 34, through which passes the line 16 from the spool 14. In one exemplar embodiment shown in the drawings, this line guide 34 is mounted in the center of a front housing 28 which is mounted to the front plate 12 of the housing 10.

The line guide 34 in teh invention additionally eliminates or significantly reduces line twist, a common problem with piror art spincast and spinning reels. The inner race 62 of line guide 34 contains a line contacting circular aperture 58 and is rotatably supported by circular, low friction balls 61. The inner race 62 of this ball bearing assembly 60 forms the inner surface 56 of the line guide 34 upon which the line 16 rides as it is cast, paid out, or retrieved. In contrast to the prior art sleeves, surface inserts, or surface smoothing, the use of a bearing race 62 as the inner line contacting surface 56 of the line guide 34 has proven to significantly reduce line twist, and to significantly reduces the cranking power required to retrieve the line 16 under load.

Figure 5:
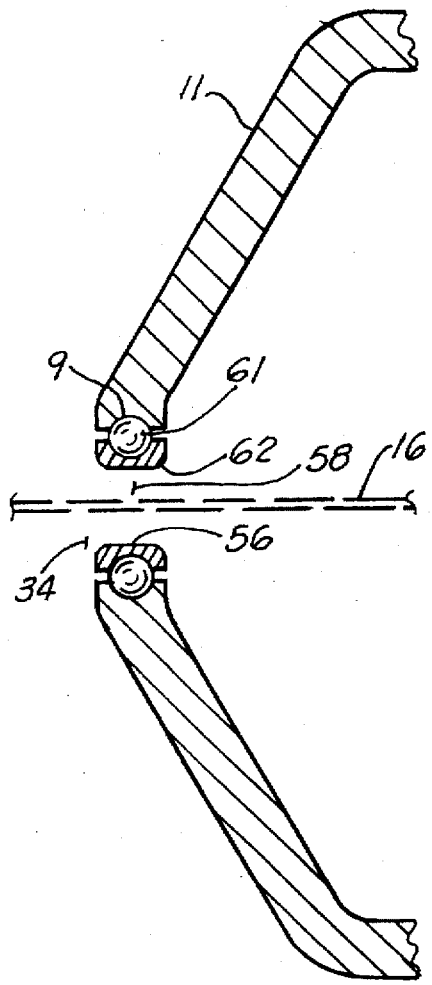
FIG. 5 is a cut away view of the invention showing the freely rotating inner race supported on ball bearings, where the outer race constitutes a portion of front housing.

It can easily be seen in FIG. 5 that a front housing 11 of a spin cast reel 2 may be manufactured in such a manner as to form the outer race 9 of the line guide 34 and eliminate the necessity of a separate outer race 9.

It can be easily seen by one skilled in the art that a rod line guide 54' normally mounted to a fishing rod 5 may be manufactured in such a way as to allow for a fitted line guide bearing 60' or to incorporate an inner race 62 and supporting balls 61 into a unitized housing.

The angle of the line 16 as it passes through the line guide bearing 34 causes the bearing inner race 62 to rotate, eliminating most of the sliding friction which would be encountered in a fixed guide. This bearing action nearly eliminates line twist that is common to spinning and spin cast reels.

As an example, a stock Zebco (TM) model 520 reel and prototype of the disclosed invention were compared for line twist. Both reels were identically wound with Shakespeare Omniplex (TM) ten pound test line.

The line end was fastened to the center of a length of dowel rod, which was balanced to hang horizontally; the position of the dowel rod indicated any turning or twisting of the line. Thirty-seven feet of line was pulled out, without turning the dowel, and then the line was reeled back in until the dowel was within thirty inches of the reel. The induced twist was then determined by holding the reel vertical, dowel down, and counting the revolutions as the dowel rotated and the line untwisted. The dowel was stopped after each rotation to prevent false readings from dowel momentum.

The Zebco (TM) model 520 had twenty-seven twists in the line, the prototype had no twists on the first test, and two twists on a second test.

It will be apparent to those skilled in teh art that the inventive line guide 34 of the invention can also be mounted to a spinning reel 3 or to a fishing rod 5, reducing or eliminating line twist in that device.

It is thus apparent that the invention extends beyond the exemplar embodiment shown to embodiments in both open and closed cover spincast reels and to spinning reels and rods. The invention is not limited to the embodiment shown but extends to the wider range of equivalents to the claims.

I claim:

1. A system to prevent twisting of fishing line on a fishing reel moutned to a fishing rod, the fishing reel having a front housing enveloping a line spool having an axis, the line spool mounted with its axis aligned with the fishing rod,, the system comprising:

a line guide mounted to the front housing of the fishing reel, said line guide having a freely rotating sleeve member encircling a portion of the fishing line.

2. A system to prevent twisting of fishing line, comprising a fishing reel having a line spool having said fishing line spooled thereabout, said fishing reel further comprising a front housing enveloping said line spool, a line gudie mounted adjacent to said front housing of said fishing reel, said line guide having a passage formed therein for the passage of said fishing line therethrough, said line guide encircling the passage formed in said housing with a freely rotatable sleeve for reducing friction between said fishing line and said housing.

3. The apparatus of claim 2, wherein said freely rotatable sleeve is supported by ball bearings, forming an inner race.

4. The apparatus of claim 3, wherein said fishing reel has a forward portion, and said ball bearings further contact an outer race suported by said front housing, said inner race and said outer race combining together to form a forward portion of a fishing reel.

5. The apparatus of claim 2, wherein said fishing reel is supported by a rod having a said line guide mounted adjacent to said front housing of said reel.

6. The method of preventing twisting of a fishing line, comprising the steps of:
   a. providing a fishing reel mounted to a fishing rod, the fishing reel having a front housing enveloping a line spool having an axis, the line spool fo said fishing reel mounted with its axis aligned with the fishing rod;
   b. providing a line guide supported by said front housing of said fishing reel, said line guide further comprising a feely rotatable sleeve encircling the line;
   c. casting said fishing line;
   d. engaging said fishing reel, causing said casted fishing line to stream into said fishing reel;
   e. allowing said streaming fishing line to contact said freely rotatable sleeve;
   f. rotating said freely rotatable sleeve of said line guide in response to said streaming fishing line contacting said line guide;
   g. preventing twisting of said streaming fishing line.

7. The method of preventing twisting of a fishing line, comprising the steps of:
   a. providing a fishing reel mounted to a fishing rod, the fishing reel having a front housing enveloping a line spool having an axis, the line spool of said fishing reel mounted with its axis aligned with the fishing rod;
   b. providing a line guide supported by said fishing rod, said line guide situated adjacent to said front housing of said fishing reel, said line guide having a freely rotatable sleeve encircling the line;
   c. casting said fishing line;
   d. engaging said fishing reel, causing said casted fishing line to stream into said fishing reel;
   e. allowing said streaming fishing line to contact said sleeve;
   f. rotating said sleeve of said line guide in response to said streaming fishing line contacting said line guide;
   g. preventing twisting of said steaming fishing line.

* * * * *